United States Patent [19]

Pierce

[11] Patent Number: 5,413,374
[45] Date of Patent: May 9, 1995

[54] ADJUSTABLE BUSHING

[75] Inventor: William C. Pierce, Muskegon, Mich.

[73] Assignee: NAI Neway, Inc., Muskegon, Mich.

[21] Appl. No.: 41,819

[22] Filed: Apr. 1, 1993

Related U.S. Application Data

[63] Continuation-in-part of Ser. No. 753,040, Aug. 30, 1991, abandoned.

[51] Int. Cl.⁶ .......................... B60G 11/26; F16F 1/38
[52] U.S. Cl. ...................... 280/713; 403/225; 403/222; 267/141.2
[58] Field of Search ............... 280/713, 711; 403/225, 403/228, 221, 222; 267/141.2, 141.6, 293

[56] References Cited

U.S. PATENT DOCUMENTS

| | | | |
|---|---|---|---|
| 2,165,702 | 7/1939 | Haushalter | 403/228 |
| 2,659,619 | 11/1953 | Kishline et al. | 403/225 |
| 2,742,302 | 4/1956 | Pointer | 280/713 |
| 4,615,539 | 10/1986 | Pierce | 280/690 |

FOREIGN PATENT DOCUMENTS

| | | | |
|---|---|---|---|
| 0020790 | 1/1981 | European Pat. Off. | 267/141.2 |
| 0390197 | 3/1933 | United Kingdom | 403/222 |

Primary Examiner—Margaret A. Focarino
Assistant Examiner—Paul N. Dickson
Attorney, Agent, or Firm—Varnum, Riddering, Schmidt & Howlett

[57] ABSTRACT

An elastomeric bushing for mounting a first member to a second member which permits limited articulation of one of the members relative to the other. The bushing comprises an inner element, an outer element, and a highly compressed elastomeric insert retained between the outer and inner elements, wherein the outer element further comprises an adjustable portion to permit limited reduction of the circumference of the outer element from a maximum circumference. The outer element is constructed to restrain the expansion forces of the highly compressed elastomeric insert to maintain substantially constant, the circumference of the outer element at a predetermined circumference, while being capable of withstanding the shear forces during installation without buckling or tearing.

23 Claims, 4 Drawing Sheets

ADJUSTABLE BUSHING

This application is a continuation-in-part of application Ser. No. 753,040, filed Aug. 30, 1991, now abandoned.

BACKGROUND OF THE INVENTION

1. Field of the Invention

This invention relates to elastomeric bushings and, more particularly, to bushings which are adjustable to permit their use in openings of varying dimensions. In another aspect, the invention relates to suspension systems for vehicles with improved bushings.

2. Description of Related Art

Elastomeric bushings have long been used in mounting one part to another while permitting limited articulation between the two parts. Such elastomeric bushings typically comprise a metal outer tube, a metal inner tube, and an elastomeric insert mounted between the inner and outer tubes. The elastomeric insert is slightly compressed. Such a bushing configuration is disclosed in U.S. Pat. No. 2,550,564 to Hutton, issued Apr. 24, 1951, and U.S. Pat. No. 2,110,783 to Welker, issued Mar. 8, 1938.

In a typical installation, the bushing is used to connect a first member with a second member in an articulatable connection. The outer tube of the bushing is usually received within an aperture in the first member and the second member is received within or connected to the inner tube. The outer tube is securely fixed to the first member and the second member is securely fixed to the inner tube. The intermediate elastomeric portion serves to permit limited articulation of the first member relative to the second. A typical application includes the bushed connection of an axle to a trailing arm in a trailing arm air spring suspension for a vehicle.

In a typical elastomeric construction, the elastomeric insert is connected to the outer and inner tubes by either bonding the elastomeric insert to the tubes or by compressing the elastomeric insert between the tubes. The elastomeric insert functions in a manner similar to a spring. As the inner metal tube articulates or rotates with respect to the outer metal tube, the elastomeric insert is extended and stretched. The resilient nature of the elastomeric insert resists the articulation or rotation and tends to urge the inner and outer metal tubes to their original relative positions. The amount of articulation between the inner metal tube and the outer metal tube is limited by the thickness or apparent fiber length of the elastomeric insert. If the articulation is great enough that the elastomeric insert is stretched beyond its limit, the bond between the elastomeric insert and the inner and outer metal tubes will fail and the elastomeric bushing will slip with respect to either or both of the inner and outer metal tubes. A typical elastomeric bushing having a slightly compressed elastomeric element can articulate approximately 20 degrees before the elastomeric insert begins slipping with respect to the inner and outer metal tubes.

In an application where the elastomeric bushing connects a vehicle trailing arm to the vehicle, a much greater degree of articulation is needed between the inner and outer metal tubes than that because of the much larger forces and increased range of movement. A slightly compressed elastomeric bushing is inadequate. Suitable elastomeric bushings having a greater degree of articulation are manufactured by the Lord Corporation of Erie, Pa. and Clevite Products of Milan, Ohio. These elastomeric bushings achieve much greater articulation by highly compressing the elastomeric insert between the inner and outer metal tubes.

In an uncompressed elastomeric bushing, the amount of relative articulation between the inner tube and the outer tube before the elastomeric insert begins to slip is a function of the resiliency of the elastomeric insert. Once the elastomeric insert has stretched to its resilient limit, any continued articulation will cause the elastomeric insert to slip. It is helpful to think of the elastomeric insert being comprised of fibers extending radially outwardly. The apparent fiber length of the fibers for an uncompressed elastomeric insert is the amount the elastomer will stretch. Thus, the apparent fiber length is a function of the resiliency of the elastomeric insert, making the relative articulation a function of the apparent fiber length. In other words, the elastomeric insert will not begin to slip until the fibers are stretched to their resilient limit or apparent fiber length.

In a compressed elastomeric bushing, the apparent fiber length is a function of the amount the elastomeric insert is compressed (the difference between the uncompressed thickness and the compressed thickness of the elastomeric insert) and the resiliency of the elastomeric insert. The relative articulation of the elastomeric bushing initially extends the fibers of the elastomeric insert to their uncompressed length before the fibers begin to stretch to their resilient limit. The compressed elastomeric insert will not begin to slip until the fibers are extended the amount the elastomeric insert is compressed and the amount the fibers will stretch. Therefore, the greater the elastomeric insert is compressed, the greater will be the relative articulation of the elastomeric bushing before the elastomeric insert will begin to slip and the greater will be the apparent fiber length. However, because of the highly compressed state of the elastomeric insert and the need to keep the elastomeric insert compressed to obtain the benefits of a greater apparent fiber length, such elastomeric bushings must be constructed to withstand the large expansion forces associated with the compressed elastomeric insert.

In using such a bushing in a trailing arm suspension, the first member typically comprises a trailing arm. Usually, such trailing arms are formed by casting, fabricating or drop-forging processes. The aperture that results from such manufacturing operations typically has two distinct problems which may drastically affect the mounting of the bushing in the aperture. First, the average diameter of the aperture will not achieve a range of close tolerances. For example, the best available tolerance of the diameter of an aperture in a drop-forged trailing arm is approximately ±0.015 inches. This creates significant problems in mounting a bushing within the aperture. If the diameter of the aperture is less than the diameter of the outer tube, the bushing cannot be received within the aperture. If the diameter of the aperture significantly exceeds the diameter of the outer tube, the outer tube will be loosely mounted in the aperture, increasing wear on the bushing, or requiring a welding operation to securely fix the outer tube within the over-sized aperture.

The second problem which often results from a drop-forged or fabricated control arm is that the aperture can be out-of-round at any point along the axis of the aperture. The aperture may be elliptically shaped at various points along the length thereof. If this elliptical shape exists, the outer tube may or may not be mountable within the aperture. For example, if the shorter diameter of the elliptical opening is less than the diameter of the outer tube, but the longer diameter of the elliptical shape is greater than the diameter of the outer tube then the outer tube can still be received within the aperture if the overall circumference of the elliptical opening of the aperture is greater than the circumference of the outer tube. The outer tube will flex somewhat, to assume the elliptical shape and accommodate the shorter diameter. However, if the overall circumference of the elliptical opening does not exceed the circumference of the outer tube, then the outer tube cannot be received in the aperture. Therefore, it is seen that the outer tube can accommodate some variations in the geometry of the aperture, however, there is a limit to the variations which the outer tube can withstand.

An additional problem is that the elastomeric bushings are typically mounted within the aperture by applying a large axial force to the elastomeric bushing, driving the elastomeric bushing into the aperture. The outer tube of the elastomeric bushing must be capable of withstanding the large shear forces between the inner surface and edge of the aperture created by the large axial force.

One solution for overcoming the tolerance and the out-of-round problems is to machine or otherwise finish the aperture to a suitable shape and dimension for receiving the bushing. Unfortunately, such operations are costly, time consuming and labor intensive and therefore not preferred.

Another solution to accommodate dimensional and geometrical differences in the aperture is to eliminate the outer tube from the bushing and press-fit only the inner tube and elastomeric portion into the aperture. The elastomeric portion does not have the same tolerance limitations as the metal outer tubing and can accommodate the geometrical and dimensional variations in the aperture. Unfortunately, this structure results in increased wear on the elastomeric portion, thereby shortening the life span of the bushing. The life span of the bushing is effectively cut in half by eliminating the outer sleeve and utilizing only the elastomeric portion and inner tube, therefore, making this solution decidedly unacceptable.

Still another solution is to provide the bushing with a variable outer diameter, such as the bushing disclosed in the French patent to Menard, 680,434, issued Apr. 29, 1930. Menard is not suitable for use in a vehicle suspension comprising a trailing arm because the outer tube of Menard is not strong enough to restrain the expansion of the highly compressed elastomeric insert, negating the advantage of an increased apparent fiber length by compressing the elastomeric insert. Moreover, the outer tube of Menard is not capable of withstanding the large shear forces imparted to the elastomeric bushing during insertion.

SUMMARY OF INVENTION

The invention improves upon bushings found in the prior art by providing a bushing with a variable outer circumference or circumference such that it may be securely fixed within an aperture of predetermined circumference at optimum tolerances and, consequently, lower cost. The bushing can overcome certain dimensional and geometrical variations in the aperture.

According to the invention, there is provided an elastomeric bushing for mounting a first member to a second member wherein the first member has an aperture with a predetermined circumference. The bushing is receivably mounted within the aperture and comprises an inner element, an outer element and an elastomeric insert. The inner element is adapted to be securely fixed to the second member. The outer element is adapted to be received within the aperture. The elastomeric insert is compressively retained between the inner and outer elements. The outer element further comprises an adjustable portion such that the outer element has a circumference nominally greater than the predetermined circumference of the aperture. The adjustable portion of the outer element permits the circumference thereof to be adjusted so that the bushing can be tightly received within the aperture.

Preferably, the adjustable portion of the elastomeric bushing comprises an axially extending slit in the outer element.

In another aspect of the invention, the adjustable portion comprises an axially extending inner directed bend in the outer element.

In another aspect of the invention, the outer element is split axially and has a first edge and a second edge. The adjustable portion comprises the first edge having a tongue and the second edge having a complementary groove, wherein the tongue is received in the groove.

In yet another aspect of the invention, the adjustable portion of the elastomeric bushing comprises axial corrugations in the outer element. Preferably, the corrugations are radially arranged around the entire circumference of the outer member.

In another aspect of the invention, the outer element has an annular lip on each of the ends of the outer element. The annular lip is directed radially inward to facilitate press-fitting of the outer element in the aperture. Preferably, the circumference of the annular lip is slightly less than the circumference of the aperture.

In still another aspect of the invention, a suspension system has a trailing arm, a hanger bracket for pivotably mounting the trailing arm to a vehicle frame, an air spring mounted to another end of the trailing arm and adapted to mount to a vehicle frame, and an axle bracket adapted to mount an axle to the trailing arm wherein the axle bracket and/or the hanger bracket is mounted to the trailing arm through the adjustable bushing described above.

Preferably, the cross-sectional shape of the outer element is generally circular. In addition, the cross-sectional shape of the inner element is generally circular.

BRIEF DESCRIPTION OF THE DRAWINGS

The invention will now be described with reference to the following drawings, in which.

DESCRIPTION OF THE PREFERRED EMBODIMENT

Figure 1:
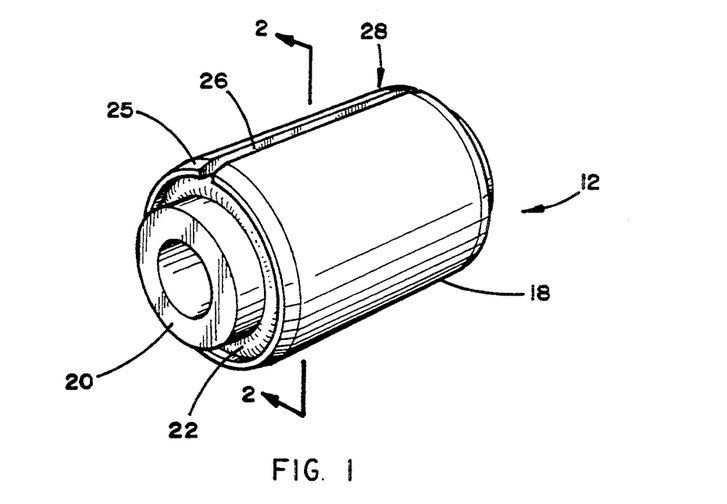
FIG. 1 is a perspective view of a first embodiment of an elastomeric bushing according to the invention.

Referring now to the drawings, and to FIG. 1 in particular, an elastomeric bushing 12 comprises an outer element 18, an inner element 20 and an elastomeric insert 22 compressively retained between the outer and inner elements. Preferably, the elastomeric insert is highly compressed between the inner element 20 and outer element 18 to increase the apparent fiber length and to ensure a greater degree of articulation between the inner element 20 and outer element 18 before slippage of the elastomeric insert 22. Typically, the elastomeric insert 22 would be compressed approximately 50% to ensure angular articulation of approximately 40° before slippage of the elastomeric insert 22.

The outer element further comprises an adjustable portion 28, which permits limited variation in the circumference or outer diameter of the outer element 18. The adjustable portion 28 does not prevent or interfere with the outer element 18 restraining the expansion forces of the highly compressed elastomeric bushing. Moreover, in restraining the expansion forces of the elastomeric element, the circumference outer of the outer element 18 is maintained substantially constant along the length of the outer element 18 to preserve the benefit of the increased apparent fiber length. The radial edge 25 on each end of outer element 18 can be tapered to facilitate press-fitting of the bushing 18 within a suitable aperture, as described below.

Figure 2:
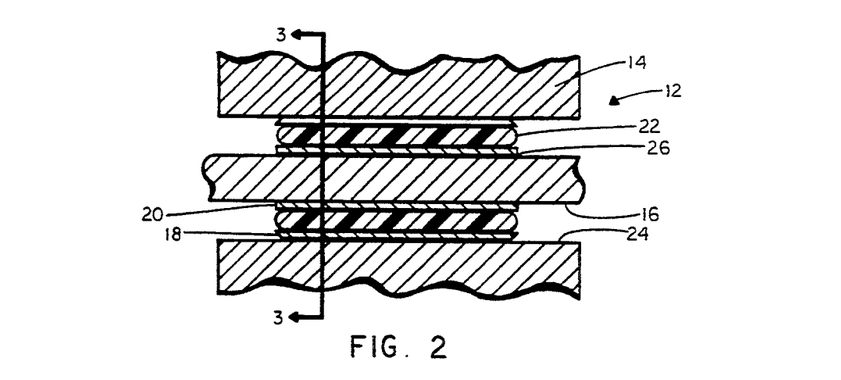
FIG. 2 is a sectional view of the first embodiment of the elastomeric bushing according to the invention as installed with first and second members.

As seen in FIG. 2, an elastomeric bushing 12 is mounted to a first member 14. The bushing 12 functions to connect a second member 16 to the first member 14 and at the same time to permit limited articulation of the members with respect to each other. The outer element 18 is adapted to be securely fixed in an aperture 24 of the first member 14. Similarly, the second member 16 is received in an aperture 26 in the inner element 20 and is securely fixed thereto. The elastomeric insert 22 may be bonded by adhesive, extrusion or otherwise to the inner and outer elements 18, 20, but it may also be press-fit into engagement between the inner and outer elements. Although, the second member 16 is shown passing through the aperture 26 of the inner element 20, it is within the scope of the invention for the inner element 20 to be solid.

Elastomeric bushings have a wide variety of applications including, for example, use in a truck suspension mounting. In a vehicle suspension, the bushing is used in the connection between an axle and an axle mounting bracket. An example of this use is disclosed in U.S. Pat. No. 4,615,539, to Pierce issued Oct. 7, 1986, which is expressly incorporated herein by reference. The bushing can also be used to mount a trailing arm to a hanger bracket.

Applying FIG. 2 to a bushing in a truck suspension mounting as seen in U.S. Pat. No. 4,615,539, the first member 14 would be a portion of a trailing arm and the second member 16 would be a portion of a mounting bolt used to secure the trailing arm to an axle mounting bracket on the vehicle frame. The trailing arm incorporates an aperture that receives the bushing 12 and the mounting bolt passes through the inner member of the bushing. The bushing can also be used to mount the trailing arm to the hanger bracket.

In the preferred embodiment, the bushing 12 is assembled by extruding the elastomeric material comprising the elastomeric insert 22 circumferentially around the outer diameter of the inner element 20. The elastomeric material is extruded such that, in the hardened state, the thickness of the elastomeric insert 22 is greater than the distance between the outer diameter of inner element 20 and the inner diameter of outer element 18. With this configuration, the elastomeric insert 22 will be under compression when it is mounted inside the outer element 18. The bushing is completed by inserting the compressed elastomeric element 22 into the outer element 18 and around the inner element 20. Preferably, the elastomeric element is completed by press-fitting the inner element 20 and the elastomeric insert 22 into the outer element 18, thereby compressing the insert 22 between the inner and outer elements.

The bushing 12 is adapted to be press-fit into the aperture 24 of the first member 14. The aperture 24 extends through the first member 14 and the circumference of the aperture 24 is preferably nominally less than the circumference of the outer element 18. Preferably, the outer element 18 is attached to the first member 14 by a friction fit within the aperture 24, but it may also be secured by adhesive or welding. Typically, the first member 14 is made from cast, wrought or drop-forged steel and the outer element is steel tubing. Through the use of these two materials and the environment of air and water in which the bushing typically operates, both the outer element and first member will rust to some degree. The combination of the rust between the two elements and the friction fit will result in suitable attachment of the outer element 18 to the first member 14.

The final step in assembling the bushing 12 is to press-fit the second member 16 into the inner element 20. Ideally, the outer diameter of second member 16 closely approximates the inner diameter of inner element 20. Alternatively, the inner element 20 is larger, axially, than the outer element 18. Thus, the member 16 can be mechanically secured to the inner element 20 as by clamping while permitting the outer element 18 to move relative to the inner element.

Figure 3:
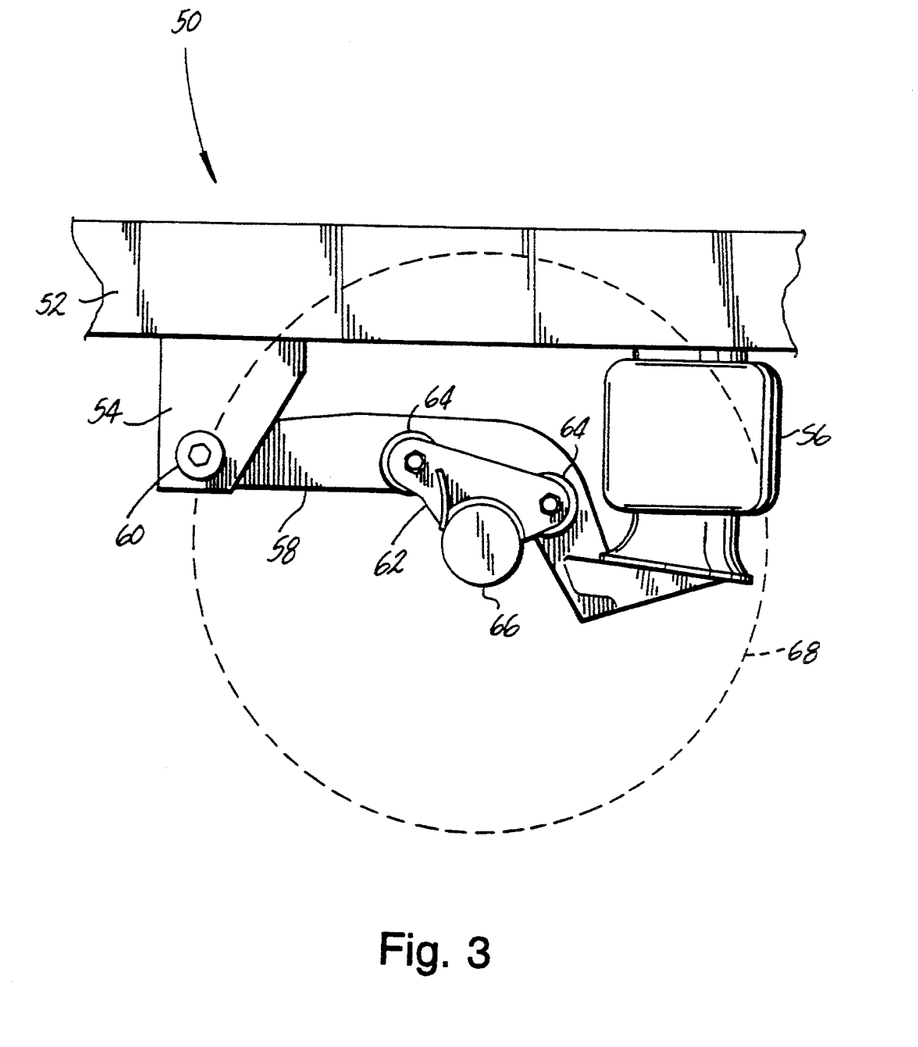
FIG. 3 is a side view of a vehicle suspension incorporating the first embodiment of the elastomeric bushing according to the invention.

FIG. 3 illustrates a typical vehicle suspension 50 which can use an elastomeric bushing having a highly compressed elastomeric element. The vehicle suspension 50 comprises a frame member 52 to which is mounted a hanger bracket 54 and an air spring 56. A trailing arm 58 is rigidly connected at one end to the air spring 56 and pivotally connected at the other end to the hanger bracket 54 by an elastomeric bushing 60. An axle mounting bracket 62 is mounted to the trailing arm 58 by elastomeric bushings 64. The axle mounting bracket 62 has means for mounting an axle 66, which is connected to wheels 68 shown in phantom.

According to the invention, in such a configuration, the trailing arm 58 is subjected to very large articulation loads, requiring that the elastomeric bushing connecting the trailing arm 58 to the hanger bracket 54 provide a large degree of articulation before the elastomeric element begins slipping. Therefore, for maximum durability, it is necessary to use an elastomeric bushing having a highly compressed elastomeric element. The elastomeric bushing is inserted into the aperture in the hanger bracket by imparting a force to the elastomeric bushing to drive the elastomeric bushing into the aperture. Preferably, a press or other such device is used to impart the force to the elastomeric bushing. During the insertion of the elastomeric bushing into the aperture of the hanger bracket, the outer element 18 of the elastomeric bushing is subjected to large frictional and sheer forces from its contact with the edge and wall of the aperture 24.

The material of the outer element 18 and its thickness must be carefully selected so that the material is thick enough to resist tearing, splitting or buckling during the insertion of the elastomeric bushing 12 into the aperture 24. Preferably, the outer element 18 is made from hardened steel.

As seen in FIGS. 4–7 and 11, the outer element 18, inner element 20 and elastomeric insert 22 are preferably generally circular in cross section wherein the outer and inner elements comprise circular tubes creating a tube-shaped bushing 12 with the inner element being axially received within the outer element 18. The bushing 12 is by no means limited to circular tube shapes. A wide variety of other geometric cross-sectional shapes including, but not limited to ovals, squares and triangles may be used.

Circular tubes may be manufactured by a wide variety of processes, but are commonly manufactured by centrifugal casting or by extruding or drawing a suitable material over a mandrel. The inner and outer elements of the bushing, according to the invention, can be formed by any such suitable process.

Ideally, the outer diameter of the outer element 18 will be equal to the inner diameter of the aperture 24 such that the outer surface of the outer element will bear at all points against the inner surface of the aperture 24. If the outer diameter of outer element 18 is significantly less than the inner diameter of aperture 24, then the bushing will be loosely mounted in the first member 14 which is unacceptable for uses such as a truck suspension system. Likewise, if the outer element is out of round beyond a close tolerance range, then additional operations are necessary to bring the dimensions within tolerance.

As seen in FIGS. 1 through 12, the bushing 12, according to the invention, incorporates an adjustable portion 28 on all or substantially all of the length of the outer element 18 so that the circumference thereof is variable. The outer element 18 has a maximum circumference nominally greater than the circumference of the aperture 24 and can be tightly received in the aperture of the first member 14 by reducing its circumference.

Figure 4:
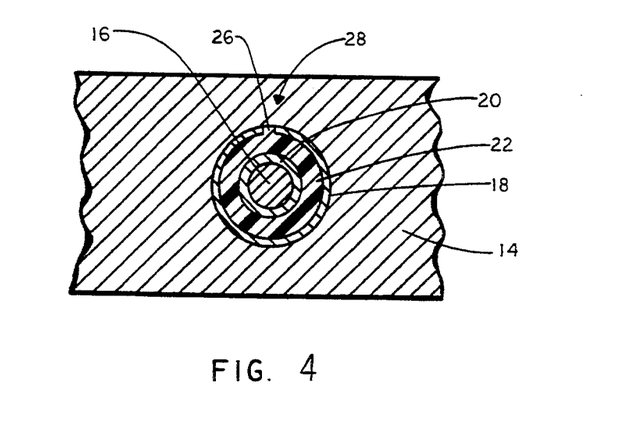
FIG. 4 is a cross-sectional view of the first embodiment of the elastomeric bushing taken along lines 3—3 of FIG. 2.

The outer element 18 incorporates an adjustable portion 28 which extends longitudinally, the entire length or substantially the entire length of outer element 18. As seen in FIGS. 1 and 4, the adjustable portion of a first embodiment of the outer element 18 comprises an axially extending slit 26. The inner element 20 is co-axially received within outer element 18 and the elastomeric insert is compressively mounted between the inner and outer elements, 20 and 18.

The circumference of the outer element 18 is predetermined to nominally exceed the circumference of the aperture 24 of the first member 14. By circumferentially compressing and plastically deforming the outer element 18, the circumference thereof may be slightly reduced such that the outer element 18 can be press-fit into the aperture 24. The adjustable portion 28 permits this circumferential compression and the compression is resisted by the strength of the outer element 18 and the elastomeric insert 22 contained therein.

Because the slit 26 reduces the ability of the outer element 18 to resist the expansion forces of the highly compressed elastomeric insert relative to an outer element without a slit, the thickness of the outer element 18 must be sufficient to restrain the expansion of the elastomeric element and obtain the advantage of the increased apparent fiber length. When the proper thickness of the desired material is selected for the outer element 18, the expansion force exerted by the highly compressed elastomeric insert 22 on the split outer element 18 is generally not enough to overcome the strength or memory of the material forming the outer element 18 (preferably steel) because of the thickness of the outer element 18. Therefore, the circumference of the outer member is substantially unchanged by insertion of the elastomeric insert 22 therein and the circumference remains substantially constant along the length of the elastomeric bushing 12. The compressive force exerted on the elastomeric insert 22 by the outer element 18 will result in contact between the insert 22 and the substantially all of the internal surface of the outer element 18.

Once the outer element 18 is press-fit within the aperture 24, the memory of the steel causes the outer element to expand to the maximum circumference or diameter permitted by the aperture 24. The outer element 18 will also tend to conform to the shape of the aperture 24 and, thus, accommodate a slightly out-of-round condition. The expansion of the outer element 18 within the aperture 24 is enhanced by the expansive force exerted by the highly compressed elastomeric insert 22. The combination of the memory of the steel and the force exerted by the elastomeric insert 22 results in the outer element 18 being tightly received along the entire length of aperture 24 despite variations in the overall circumference of the aperture 24.

Figure 5:
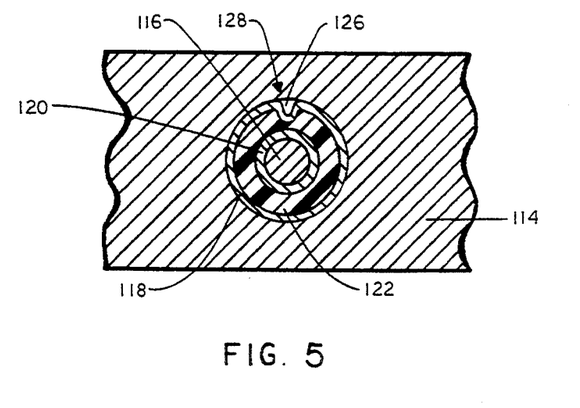
FIG. 5 is a cross-sectional view of a second embodiment of the elastomeric bushing similar to the view of FIG. 3.

FIG. 5 shows an alternative embodiment for the adjustable portion, thereby providing different means for creating a variable circumference of the outer element. For this description, numerals analogous to the first embodiment will be increased by 100. In this embodiment, the adjustable portion 128 comprises an axially extending inner directed bend 126. As with the slit 26 of the first embodiment 18, the bend 126 permits limited expansion and contraction of the circumference of the outer element 118. In contrast, the outer element 118 need not be as thick as the outer element 18 of the first embodiment because the radial rigidity of the outer element 118 is not compromised by a slit. However, the outer element 118 must be sufficiently thick to maintain the circumference of the outer element 118 substantially constant and to withstand sheer forces during insertion of the elastomeric bushing 112.

The elastomeric insert 122 is compressively mounted between the inner element 120 and the outer element 118 and the strength or memory of the outer member 118 overcomes the expansion force, thereby creating an outer element 118 of a prescribed circumference which is nominally larger than the inner circumference of the aperture 124 of the first member 114.

As with the first embodiment, the outer element 118 is circumferentially compressed and press-fit into the aperture 124 of the first member 114, preferably by a large axial force. The force exerted by the memory of the steel of the outer element 118 in conjunction with the expansion force exerted by the compressed elastomeric insert 122 causes the outer element 118 to expand outwardly to the maximum circumference permitted by the inner circumference of aperture 124 up to the prescribed circumference of outer element 118. This creates a tight fit along the length of the bushing 112 within the aperture 24.

Figure 6:
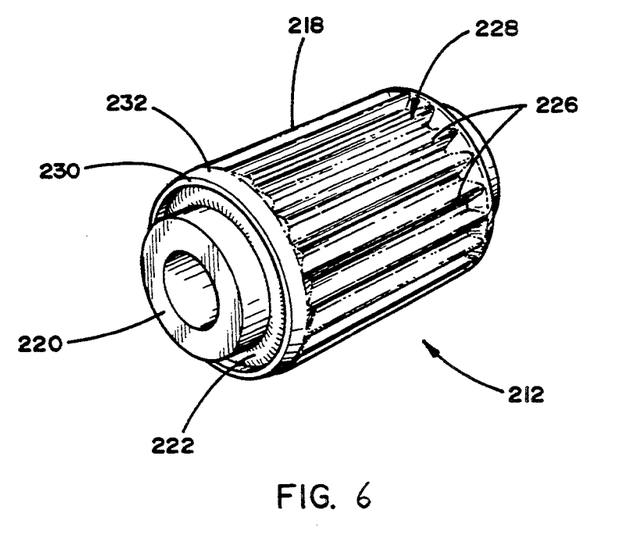
FIG. 6 is a perspective view of a third embodiment of the elastomeric bushing according to the invention.
Figure 7:
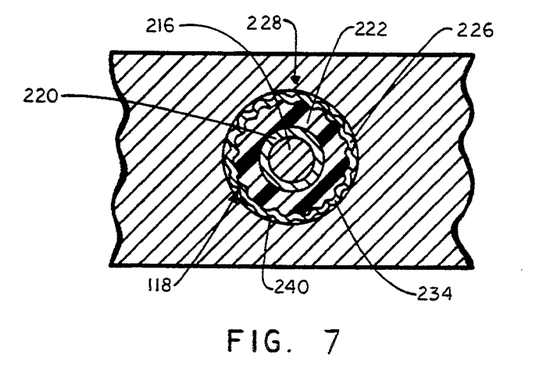
FIG. 7 is a cross-sectional view of the third embodiment of the elastomeric bushing according to the invention.

FIGS. 6 and 7 show another embodiment for the adjustable portion, thereby providing different means for creating a variable circumference for the outer element. For this description, numerals analogous to the first embodiment will be increased by 200. In this embodiment, the adjustable portion 228 comprises a plurality of corrugations 226. Each individual corrugation is U-shaped. The corrugations 226 are arranged radially around the circumference of outer element 218 and extend longitudinally. The corrugations may extend the entire length or preferably extend only the substantial length of the outer element 218. Like the inner directed bend 126, the thickness of the outer element 218 can be less than the outer element 18, but must be able to withstand the large shear forces during insertion.

Figure 8:
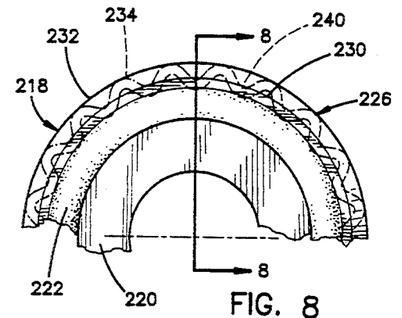
FIG. 8 is a partial end view of the third embodiment of the elastomeric bushing according to the invention.
Figure 9:
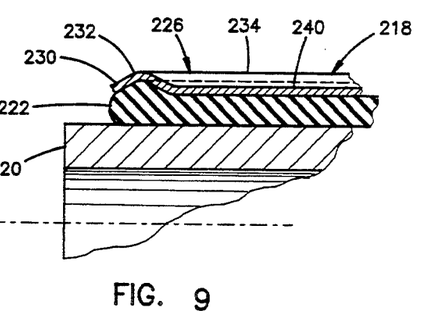
FIG. 9 is a partial sectional view of the third embodiment of the bushing taken along lines 8—8 of FIG. 7.

As seen in FIG. 6, the corrugations 234 span the bulk of the length of the body of outer element 218, however, the corrugations 234 do not extend to the ends of outer element 218. Rather, they terminate at an annular lip 236 on each of the ends of the outer element 218. The annular lip 236 extends around the entire circumference of ends of outer member 218. As seen in FIGS. 8 and 9, the annular lip 236 comprises a leading edge 230 and an arcuate portion 232. The leading edge 230 is angled radially inward toward the longitudinal axis of the outer element 218. The arcuate portion 232 extends radially outward from the leading edge 230 and then curves to meet the corrugations 226 which span the body of the outer element 218. The annular lip has a circumference nominally less than the predetermined circumference of the bushing 212. This lesser circumference is preferably created by a swaging operation at the outboard edge of the lip 236 but may also be created by a crimping operation.

The annular lip 236 serves two distinct functions for the bushing 212. First, the radially inward directed annular lip has a circumference nominally less than the predetermined circumference of the bushing and therefore facilitates the introduction of the bushing into the aperture. Secondly, the lip increases the shape factor of the bushing and therefore increases the durability of the elastomeric insert 222. The durability of the elastomeric insert 222 varies with changes in the shape factor of the bushing 212; the higher the shape factor the more durable the elastomeric insert 222.

Figure 11:
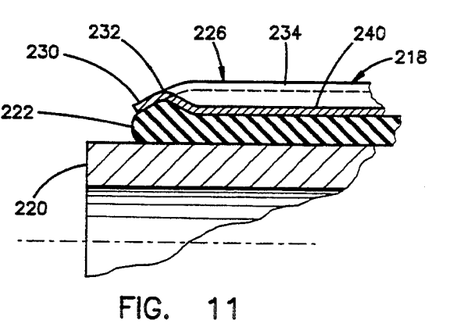
FIG. 11 is a partial sectional view of the fourth embodiment of the bushing taken along lines 10—10 of FIG. 9.

The shape factor is a function of the ratio of the projected load carrying area of the bushing. This ratio is equal to the area of the elastomeric insert 222 which is in contact with the inner element 220 to the exposed area of the elastomeric insert 222. As seen in FIGS. 9 and 11, the leading edge 230 of the annular lip 236 wraps around the exposed edge of the elastomeric insert 222, thereby decreasing the area of the exposed end of the elastomeric insert 222. This decrease in the exposed area of the elastomeric insert 222 results in an increase in the shape factor, thereby evincing an increase in the durability of the elastomeric insert 222.

As seen in FIGS. 8 and 9, the radially outermost edge of the arcuate portion 232 extends radially outwardly such that the outer diameter of the arcuate portion 232 is substantially equal to the outer diameter of the peaks 234 of the corrugations 226. This correspondence between the diameters of the peaks 234 and the arcuate portion 232 may be varied, as seen in the fourth embodiment of FIGS. 9 and 10. In this embodiment, the outer diameter of arcuate portion 232 does not extend to the outer diameter of the peaks 234 of the corrugations 226, but rather to a point approximately midway between the peaks 234 and the valleys 240 of the corrugations 226.

As seen in FIG. 6, the ends of the annular lip 236 of the outer element 218 have a circumference slightly less than the circumference of the corrugations 226, resulting in the tapering of the ends. The tapering of the ends makes press-fit mounting of the bushing 218 within the aperture 224 easier, but does not detract from the tight, friction-fit of the bushing 212 within the aperture 224.

Figure 10:
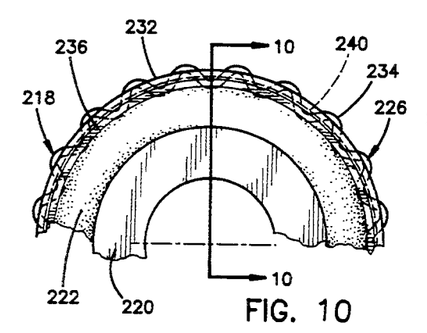
FIG. 10 is a partial end view of a fourth embodiment of the elastomeric bushing according to the invention.

Although not shown separately in the drawings, bend 126 of the second embodiment of outer member 118 is similar to the corrugations 226 of the third embodiment in that the bend 136 may not extend the entire length of the outer member 118. Rather, annular lips as shown in FIGS. 9–11 may be incorporated which surround the circumference of the ends of the circular outer element thereby creating a slightly barrel-shaped cylinder.

Figure 12:
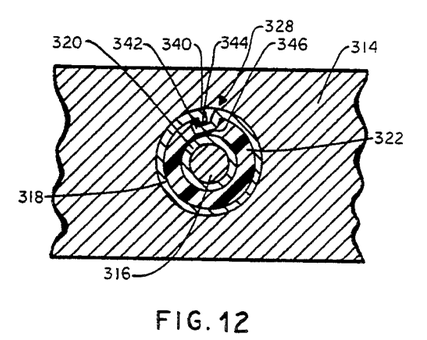
FIG. 12 is a cross-sectional view of a fifth embodiment of the elastomeric bushing according to the invention.

FIG. 12 shows a fifth embodiment of the outer element with an adjustable portion which provides a variable circumference. For this description, numerals analogous to the first embodiment will be increased by 300. The variable circumference or diameter of the outer element 318 is achieved by a first edge 340 and a second edge 342 which interlocks with first edge 340. The first edge 340 terminates in a tongue 344, and the end of the second edge 342 defines a groove 346 complementary in shape to the tongue 344. The groove 346 is adapted to receive the tongue 344. The edges extend longitudinally, the entire length of outer element 318. The complementary tongue 344 and groove 346 permit limited changes in the diameter or circumference of the outer element 318. Like the inner directed bend 126, the thickness, of the outer element 318 can be less than the outer element 18, but must be able to withstand the large shear forces during insertion.

While particular embodiments of the invention have been shown, it will be understood that the invention is not limited thereto and reasonable modifications and variations are possible without departing from the spirit of the invention.

The embodiments of the invention in which an exclusive property or privilege is claimed are defined as follows:

1. A bushing assembly for a vehicle suspension wherein a suspension member is mounted to a vehicle frame through the bushing assembly with limited articulation between the suspension member and the vehicle frame, said suspension member having an aperture defined by a cylindrical wall having a predetermined circumference, said bushing assembly comprising:
   a rigid inner element adapted to be securely fixed to the vehicle frame,
   a substantially inflexible tubular outer element having an outer surface and having a circumference nominally greater than the predetermined circumference, said inner element being disposed within and spaced from the outer element, an elastomeric insert having a diameter in an uncompressed state greater than an inside diameter of the outer element and compressively retained between the outer element and the inner element and the outer element having sufficient rigidity to resist a spring force of the elastomeric insert in compression, the outer element including an adjustable portion for enabling the circumference thereof to be reduced by applying a force to the outer surface against the spring force, whereby upon reducing the circumference of the outer element to a dimension less than the predetermined circumference, the bushing assembly can be easily received in the aperture whereupon the spring force will urge the outer surface to bear directly against the cylindrical wall to frictionally retain the bushing assembly within the aperture.

2. A bushing assembly according to claim 1 wherein the adjustable portion comprises an axially extending inner directed bend in the outer element.

3. A bushing assembly according to claim 2 wherein said outer element further comprises a radially inwardly directed annular lip on each end of the outer element having a circumference nominally less than the predetermined circumference.

4. A bushing assembly according to claim 2 wherein said outer element is generally tubular having a cross-sectional shape approximating a circle.

5. A bushing assembly according to claim 4 wherein the cross-sectional shape of said inner element is generally circular.

6. A bushing assembly according to claim 5 wherein the inner and outer elements are coaxial.

7. A bushing assembly according to claim 1 wherein the outer element is split axially having a first edge and a second edge, and the adjustable portion comprises the first edge having a tongue and the second edge having a groove, the tongue being received within the groove.

8. A bushing assembly according to claim 7 wherein the cross-sectional shape of said inner element is generally circular.

9. A bushing assembly according to claim 7 wherein said outer element is generally tubular having a cross-sectional shape approximating a circle.

10. A bushing assembly according to claim 9 wherein the cross-sectional shape of said inner element is generally circular.

11. A bushing assembly according to claim 10 wherein the inner and outer elements are coaxial.

12. A bushing assembly according to claim 1 wherein the adjustable portion comprises axial corrugations in the outer element.

13. A bushing assembly according to claim 12 wherein said outer element further comprises a radially inwardly directed annular lip on each end of the outer element having a circumference nominally less than the predetermined circumference.

14. A bushing assembly according to claim 12 wherein said outer element is generally tubular having a cross-sectional shape approximating a circle.

15. A bushing assembly according to claim 14 wherein the cross-sectional shape of said inner element is generally circular.

16. A bushing assembly according to claim 15 wherein the inner and outer elements are coaxial.

17. A bushing assembly according to claim 12 wherein said corrugations are radially arranged around the entire circumference of said outer member.

18. A bushing assembly according to claim 1 wherein the adjustable portion comprises an axial slit extending the entire length of the outer element.

19. A bushing assembly according to claim 18 wherein said outer element is generally tubular having a cross-sectional shape approximating a circle.

20. A bushing assembly according to claim 19 wherein the cross-sectional shape of said inner element is generally circular.

21. A bushing assembly according to claim 20 wherein the inner and outer elements are coaxial.

22. A bushing assembly according to claim 1 wherein said outer element is generally tubular having a cross-sectional shape approximating a circle.

23. In a suspension system for mounting a wheel bearing axle to a vehicle frame, the suspension comprising: a trailing arm having at least one trailing arm aperture of predetermined circumference; a hanger bracket pivotably mounted to one end of the trailing arm through a first bushing and adapted to mount the trailing arm to a vehicle frame; an air spring mounted to another end of the trailing arm and adapted to mount to a vehicle frame; an axle bracket for mounting an axle and mounted to the trailing arm through a second bushing; the improvement which comprises:

at least one of said first and second bushings comprising an inner element, said inner element further being securely fixable to one of the vehicle frame and axle, an outer element mountable to the trailing arm anal having an outer surface and a circumference nominally greater than the predetermined circumference of the trailing arm aperture, said inner element being disposed within and spaced from the outer element, said outer element being substantially rigid, an elastomeric insert having a diameter in an uncompressed state greater than an inside diameter of the outer element and compressively retained between the outer element and the inner element and the outer element having sufficient rigidity to resist a spring force of the elastomeric insert in compression, and the outer element including an adjustable portion for enabling the circumference thereof to be reduced by applying a force to the outer surface against the spring force, whereby upon reducing the circumference of the outer element to a dimension less than the predetermined circumference, the bushing assembly can be easily received in the aperture whereupon the spring force will urge the outer surface to bear directly against the cylindrical wall to frictionally retain the bushing assembly within the aperture.

* * * * *

UNITED STATES PATENT AND TRADEMARK OFFICE
CERTIFICATE OF CORRECTION

PATENT NO. : 5,413,374
DATED : May 9, 1995
INVENTOR(S) : WILLIAM C. PIERCE

It is certified that error appears in the above-indentified patent and that said Letters Patent is hereby corrected as shown below:

Col. 12, claim 23, line 41:

"anal" should be --and--.

Signed and Sealed this

Third Day of October, 1995

Attest:

BRUCE LEHMAN

Attesting Officer

Commissioner of Patents and Trademarks